April 28, 1925.
H. PARKS
LANTERN TYPE ADVERTISEMENT AND PICTURE DISPLAYING APPARATUS
Filed July 27, 1923  2 Sheets-Sheet 1
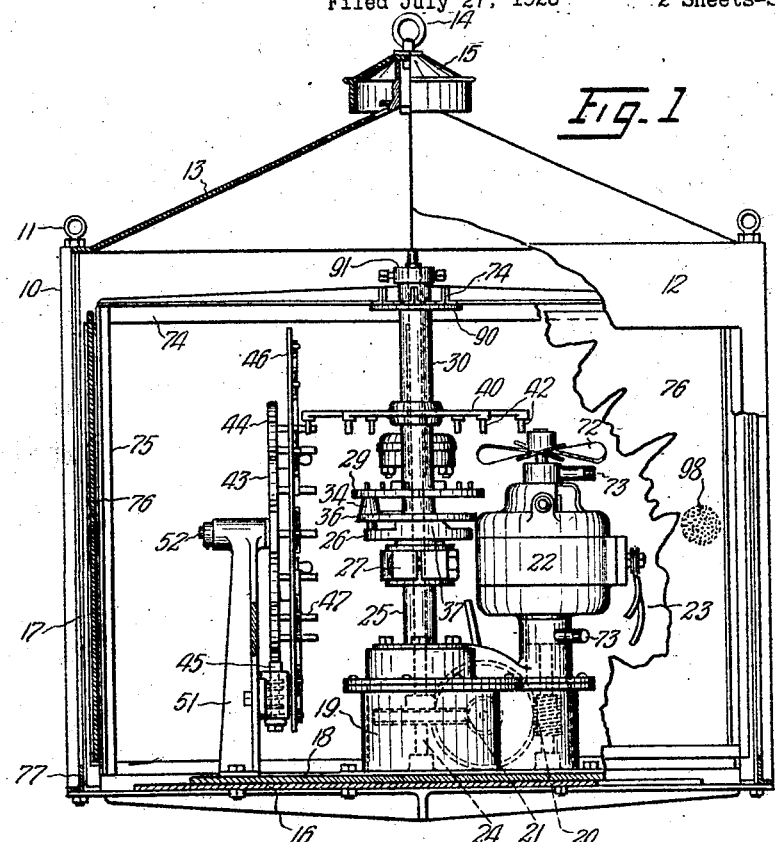
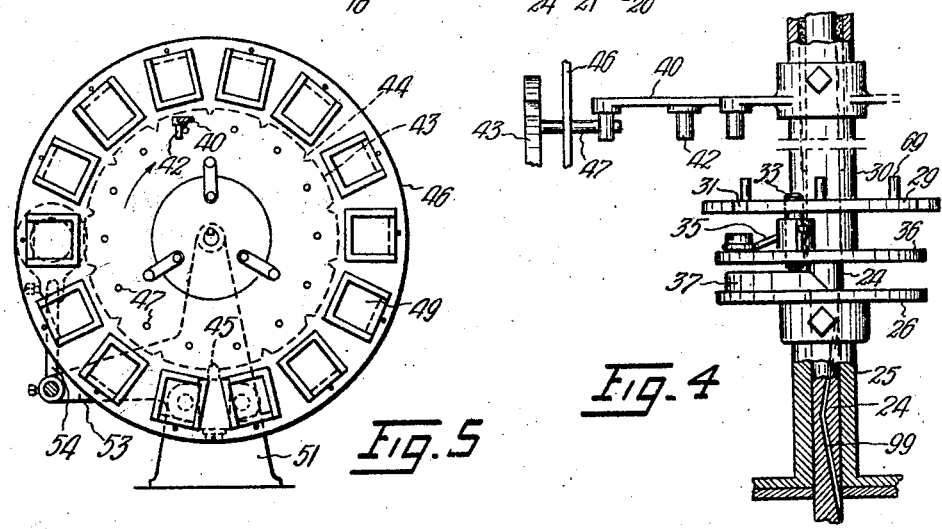

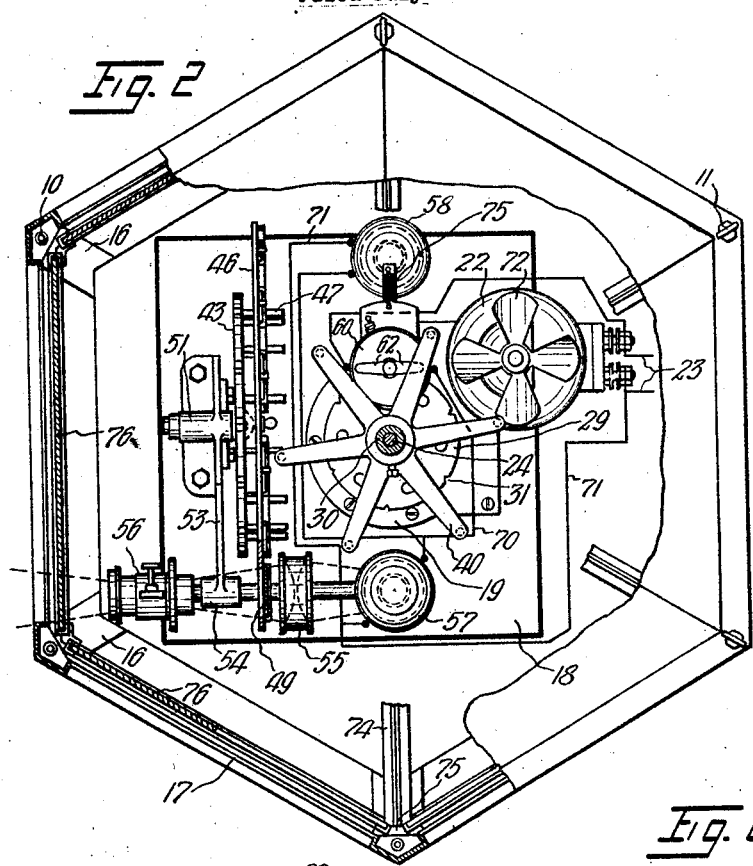

Patented Apr. 28, 1925.

1,535,131

UNITED STATES PATENT OFFICE.

HENRY PARKS, OF HABERFIELD, NEAR SYDNEY, NEW SOUTH WALES, AUSTRALIA, ASSIGNOR TO JOE MILLICAN, OF EDGECLIFFE, NEAR SYDNEY, NEW SOUTH WALES, AUSTRALIA.

LANTERN-TYPE ADVERTISEMENT AND PICTURE DISPLAYING APPARATUS.

Application filed July 27, 1923. Serial No. 654,112.

*To all whom it may concern:*

Be it known that I, HENRY PARKS, subject of the King of Great Britain, residing at 7 Empire Street, Haberfield, near Sydney, in the county of Cumberland and State of New South Wales, Australia, have invented certain new and useful Improvements in Lantern-Type Advertisements and Picture Displaying Apparatus, of which the following is a specification.

This invention relates to apparatus for displaying advertisements and for projecting pictures for display or advertising purposes.

It consists in a lantern-type apparatus containing electrically driven automatically operating mechanism for rotating the lantern intermittently for controlling an electrical circuit which serves a lamp for illuminating advertisements on the lantern sides and for operating a transparency projector, and mechanism for intermittently moving a carrier frame in which transparency slides are mounted. The whole of the mechanism is interlocked so that the lantern sides are illuminated and pictures are projected onto a screen only during dwells in the intermittent rotation of the lantern.

The lantern side panels are translucent and bear advertisement or display matter except on a limited area on each panel, which is transparent. Through the transparent area the light beam from the projector emerges, always in a fixed direction, to throw the image of a transparency in the carrier (which transparency is for the time being exposed in the path of the light beam) on a fixed wall or screen near which the apparatus is located.

The projected picture is thus made to serve the purpose of attracting attention to the lantern, the attention of persons observing the picture display being directed by the light beam towards the lantern which at each change in the display of the projected pictures turns another side of it to the observer's view, so that the advertisement or display matter carried on the respective sides of the lantern is successively brought to the attention of the observer simultaneously with progressive change in the projected pictures.

The lantern is a frame structure, preferably of hexagonal section, with panel sides and closed bottom and top, ventilation being provided for in view of the heating effects produced by the illuminating lamps contained within it. The lantern body is contained within a non-rotating fame, and the lantern mechanism is mounted on the base of the frame, the lantern being mounted on a vertical spindle about which its rotational movement takes plate. The complete structure may be suspended or may be erected on an underneath support such as a pole or a bracket.

The drive is from a fast running electric motor fitted with an air vane brake. Its circuit is continuously closed through a manually controlled switch whilst the apparatus is in operation. This motor rotates a vertical spindle through a double reduction worm drive. On the upper part of this spindle a tubular sleeve is rotatably mounted. This sleeve carries a spider frame which constitutes the top of the rotary lantern stucture. The carrier sleeve is engaged on the motor spindle by means of an automatic clutch once in each rotation of the spindle for a period equal to one-sixth such rotation (or one-eighth rotation in the case of an octagonal lantern, and similarly for other polygonal shapes other than six or eight). The sleeve is fitted with a notched disc which co-acts with a spring latch which functions as a locating device to ensure arrest of the lantern rotations at correct angular intervals. Once in each rotation of the spindle the automatic clutch engages and applies a one-sixth rotation (or other proper proportional rotation) to the sleeve, and consequently to the lanten. The sleeve carries also a pin wheel or spider having an arm for each side of the lantern and on each arm a crown pin finger. These fingers perform the double purpose of engaging tappet pins on a rotational disc which forms the part of the transparency carrier structure, and also engaging a striker to close a spring opened switch which controls the lighting circuit. A notched disc and spring latch are fitted to the carrier disc to function as a locator.

Two lamps are installed within the lantern for illuminating it and for displaying advertisement or other matter printed or painted on its panels. One of those lamps is utilised to effect projection onto a distant screen of transparency pictures which are demountably set in holders in the rotary carrier. A condenser and lens cell are provided at either side of the carrier to produce an appropriate light beam for projection purposes.

In the accompanying drawings,—

Fig. 1 is a vertical sectional elevation of the apparatus complete, portion of the enclosing casing and portion of the top spider frame of the rotational lantern being broken away to better expose to view the parts within;

Fig. 2 is a top plan with portions of the casing broken away, corresponding generally with Fig. 1;

Fig. 3 is an exploded perspective view illustrating the automatic clutch by which the crown pin wheel sleeve is engaged to the driving spindle automatically for a portion of a rotation of said spindle at each engagement;

Fig. 4 is an enlarged fragmentary elevational view explanatory of the operation of the clutch (Fig. 3) and the co-acting parts of the crown pin wheel and the transparency carrier;

Fig. 5 is a rearward elevation of the transparency carrier, and

Fig. 6 is an enlarged fragmentary sectional elevation explanatory of lubricating means on the lower end of the motor spindle on which the driving worm is fixed.

The enclosing casing comprises a group of vertical frame bars 10 fitted with eyes 11 at the top ends for the fixing of guys to hold the structure steady when it is suspended by a line from a ring 14 at the top of the cowl 15 which forms the cap of the cover 13, this cover being preferably closed to exclude dust and rain. 12 is a valance around the eave of the top cover 15; it is arranged so as to shroud the top end of the rotating lantern which is contained within the casing. 16 is the frame flooring of the case. The bottom ends of the side frame bars 10 are fixed to this framing 16, and a sill frame 77 is formed around same to enclose the lower part of the casing and to shroud the lower part of the rotating lantern structure within it. 17 are open panels in the casing between the side frame bars 10.

The bed plate 18 of the lantern mechanism is mounted on the bottom frame flooring 16 of the casing. This bed plate carries a gear box 19 containing a double reduction worm 20—21 taking the drive from the electric motor 22, reducing it to low speed, and transferring it to the vertical post spindle 24 the bottom end of which rests on a footstep bearing in the bottom of the gear box 19. The spindle 24 is supported above the box 19 in a neck bearing 25 fixed to the box top.

A disc 26 see Figs. 3 and 4 fixed to the neck bearing 25 is armed on the top face of it with a salient cam or ramp 37. A flange 36 set to allow a little clearance above the ramp 37 is keyed to the spindle 24 above the fixed disc 26. 35 is a wire spring which is fixed at one end to the flange 36 and passes its outer end through a hole in a sliding key 33 which is accommodated in a slotted bearing 34 and has sufficient length to protrude a short distance below the flange 36 when its top end is level with the top of the bearing 34. Above the flange 36 a long sleeve 30 is fitted on the spindle 24 so as to be freely rotatable on it. The sleeve 30 is fitted at either end of it with bearing bushes for the spindle. The annular space between the spindle and the sleeve between the bushes forms a grease cavity. The lower end of the spindle of the motor 22 carries the primary drive worm in the gear case; this spindle has a helical groove 95 cut in it, see Fig. 6 and the bearing 96 in which it runs has a small slot leak groove 97 in it. Oil is taken up in the groove 95 to lubricate the bearing excess oil flowing back to the gear case through the leak groove 97 (see Fig. 6). Lubrication is obtained for the bearing of the spindle 24 in the neck piece 25 by means of a hole 99 drilled angularly through the spindle (see Fig. 4). Oil mist in the gear box is taken up through this hole and spreads over the bearing face in sufficient quantity to ensure easy and safe running.

A top flange 90 on the sleeve 30 forms a central support for the spider arms 74 which form the top of the rotating lantern structure. 91 is a set collar which is fixed on the top end of the spindle 24; its function is to hold the parts in assembled position. The flange 29 on the lower end of the sleeve 30 is notched around its edge with V shaped notches 31 which are adapted to co-act with a V nosed spring latch 28 which is slidably carried in a bracket 27, 75 being a helical spring acting to force the latch 28 outward towards the flange 29. The latch 28 co-acts with the notches 31 to locate and temporarily latch the flange 29 at correct stop positions to hold the rotating lantern with its faces symmetrically disposed in register with the exposure panels 17 in the casing during the dwells in the rotation of the lantern, and to locate the clear space 98 in each panel in the path of the projected light beam.

32 are six curved slotted holes formed at equal radii and symmetrically in the flange 29 which is fixed on the sleeve 30. The key 33 is engageable in these slotted holes 32 when it is raised. The spindle 24 is maintained in continuous rotation by the motor 22 through the gearing, and, as the flange collar 36 is pinned to the spindle, that collar is continuously rotated. Once in each rotation of it, the key 33 rides over the fixed ramp 37 and is forced upwardly, so that it then engages in that one of the slotted holes 32 in the flange 29 which is for the time being in register with it. The flange 36 is thus temporarily engaged to the flange 29 and consequently moves with the sleeve 30 which is integral with the flange 29. When, however, the key 33 reaches the end of the ramp 37 it is suddenly released the spring 35 then operating to push it downward and thereby disengage it from the slot in the flange 29. Rotation applied to the flange 29 and consequently to the sleeve 30 is thus intermittent, each movement being through a sector only, each such partial rotation taking place once only in each complete rotation of the spindle 24. Consequently during five-sixths (or other proportional part) of the rotational period of the spindle 24 the lantern is at rest. As shown in the drawing, the structure is hexagonal, but it might be made of any other regular polygonal section, in which case the number of notches 31 and slots 32 would be altered accordingly and the length of the ramp 37 and the slots 32 made to correspond. Throughout this specification the apparatus is described as a hexagonal structure, but it is to be understood that the necessary variations being made, the description is to be taken to extend to any other construction, differing in the number of sides from that shown in the drawings.

The sleeve 30 carries a six-armed spider 40 with crown strike pins 42 projecting downwardly from the ends of its arms. These pins act as tappets, and they function to apply intermittent rotational movement to the transparency carrier 46 and to operate a reversing snap switch in the circuit of the illuminating lamps which are hereinafter described.

43 is a disc mounted for rotation on a horizontal axle 52 which is carried in a bracket 51 mounted on the bed 18. 44 are V notches formed in the periphery of the disc 43, one of such notches being provided for each transparency frame in the transparency carrier 46. This carrier is a disc in which is cut a symmetrically disposed group of apertures adapted to accommodate transparency slides 49. Marginal grips and button latches or other means for demountably fixing transparency slides in the apertures are provided, as shown in the drawings, these consist of grooved slips in which the marginal side edges of the transparency slides are held, check pins being inserted to lock the inserted slides, but any other form of fitting and fastening may be used to hold the slides in register in the aperture. As shown in the drawings, fourteen transparencies are mounted in the carrier, but the carrier might contain any greater or less number of slides, the gearing being appropriately arranged to move the carrier in steps to bring the individual slides successively into operative position at each movement of the sleeve 30.

The crown tappet pins 42 on the spider arms 40 are engageable with a crown of striker pins 47 projecting inwardly from the disc 43 on which the carrier 46 is fixed. Owing to the arc of movement of the pins 47 in the rotational movement of the disc 43 and carrier 46, the pins 42 engage each one of pins 47 only for a sufficient length of movement to apply drive from the sleeve 30 to the disc 43 to rotate the carrier 46 through the regulated arc, that is the distance between the edge notches 44 on the disc. 45 is an angular headed spring latch which coacts with the notches 44 on the disc 43 to locate the disc 43 at register positions and to brake it, and consequently to steady the carrier 46 whilst it is in movement.

60 is a disc of electrically insulating material having two metal contact discs 61 sunk flush with the face of it, these contacts 61 being in the lighting circuit, which is completed when the T-head 62 covers and connects them. The T-head 62 forms a switch; it is mounted on the top end of a rocking spindle 63 which is rotatable in the portion 64 of the bracket 27. A striker 65 is fixed on one end of the rocking spindle 63, and a spring 66 is connected to a pin 67 on this striker, the function of the spring being to pull the striker back against the side of the bracket 27. The projecting toe of the striker 65 is in the path of movement of the crown of upstanding tappet pins 69 on the top face of the flange 29, and the positions of these pins in relation to the locating notches 31 is such that immediately movement of the flange 29 begins, engagement between that one of the tappet pins 69 which was in engagement with the striker finger 65 ceases, and the spring 66 then acts to snap back the striker 65, so swinging the switch arm 62 to open position and procuring a quick break in the lighting circuit. As the movement of the flange 29 progresses until the next notch 31 comes towards the latch 28, the next pin 69 in order re-engages the striker 65, bringing the switch 62 back on to the contacts 61. Closing of the circuit is thus effected instantly the engaged position of the flange 29 is reached. This quick break switch therefore operates with safety, procures the cutting out of the lighting circuit without arcing immediately after movement of the change-over mechanism is commenced, and re-establishes the lighting circuit practically simultaneously with the attaining of the next rotative position of the parts.

23 are the service lines to the motor terminals from current supply mains; one of them is extended to one of the contacts 61, the other contact 61 is connected by a line 70 to the lamps 57—58 in parallel, and the return line 71 from the lamps 57—58 in parallel goes to the other lead of the supply mains. A manually controlled switch (not shown) is fitted in the service lines 23 to control the apparatus. When this switch is closed, the motor 22 and all the rotative mechanism continues in operation automatically, whilst the lighting circuit to the lamps 57—58 is interrupted automatically during the movement of the transparency carrier 46 and is closed during the dwell periods. 72 is an air propeller fitted on the top end of the spindle of the motor 22 to function as an air brake, for the double purpose of slowing down the motor a little, maintaining air circulation through the lantern, and controlling the regularity of rotation of the motor. 73 are oilers on the motor spindle bearings.

53 is a bracket which supports an adjustable subframe 54 on which is carried a condenser 55 and a projector lens cell 56. The rays from the lamp 57 pass through the condenser 55 and project the matter displayed on the transparency 49 which is for the time being in register with the lens axis, throwing the light beam through a small area (98) only in the translucent glazing 76 in the sides of the rotary lantern. A clear space, represented by the shaded disc 98, is left at the part of each glazing 76 through which the projected beam passes, but the rest of the panels 76 carry translucent advertising or other display matter which is viewed by observers directly as the lantern rotates. The light beam from the lens cell is directed onto a screen or wall, the lantern being hung or otherwise supported at an appropriate distance from such wall or screen. The light from both lamps 57 and 58 is availed of for illuminating the lantern panels.

The apparatus therefore performs the function of displaying the matter contained on the lantern sides successively during its intermittent rotation, and also projects an image of the transparencies held in the carrier successively upon a distant fixed screen or wall during the dwell periods. When the number of the transparencies fixed in the carrier is different from the number of sides on the lantern, a greater or less time will elapse before any particular display side of the lantern is presented to an observer simultaneously with a repetition of the projection of any one of the transparencies. The attention of observers is thus held for a prolonged time.

What I claim as my invention and desire to secure by Letters Patent is:—

1. A transparency display and projector lantern, comprising a casing with means for mounting or suspending it, a polygonal open bottom lantern housed within said casing and supported on a sleeve rotatable on a central vertical post spindle; an electric motor with speed reducing gear arranged for maintaining said spindle in continuous rotation; a rotatable transparency carrier mounted on a horizontal axis; an optical projector and an electric lamp arranged in operative relation to transparency slide apertures in said carrier; a crown pin wheel on said sleeve co-acting with tappets on said transparency carrier; an automatic pick-up dog clutch adapted for engaging said sleeve to said spindle during a fractional period of each rotation of said spindle; and means for arresting the partial rotary movements of said lantern and carrier at fixed angular positions and for locating and holding them steady in such positions during the dwells between successive movements, all said parts being mounted on the bottom of the housing casing.

2. In an apparatus according to claim 1, a spring opened snap switch controlled by the tripping engagement of the crown pin wheel on the intermittently rotatable sleeve, with a striker finger on said switch disposed for engagement by the crown pins on said wheel in such a way as to effect the closing of the lamp circuit during the dwells in the intermittent rotational movement of the sleeve, and the opening of said circuit whilst the sleeve is in movement.

3. A display lantern and transparency projector according to claim 1 having translucent panels in an intermittently rotatable lantern, which panels are adapted to bear advertising or display matter, and a transparent area in each said panel registering during the stop position of the lantern with a beam of light projected from a source of illumination within the lantern through a transparency slide.

4. A display lantern and transparency projector according to claim 1, having translucent panels in the intermittently rotatable lantern, which panels are adapted to bear advertising or display matter, and a transparent area in each said panel registering during the stop position of the lantern with the beam of light projected from the source of illumination within the lantern, a slide mounted in the rotary carrier and through which said beam of light projects and means for differentially rotating said lantern and said carrier.

5. Apparatus for the purposes set forth, comprising a mountable casing; a vertical post spindle therein carrying an open bottom polygonal lantern upon a sleeve rotatable on said spindle; a rotatable transparency slide carrier mounted on the casing bottom; a lamp and an optical projector device in operative relation to said carrier; a crown pin wheel on said sleeve; an intermittently operating clutch including a ramp and locking pin co-acting with a slotted flange collar for engaging said spindle to said sleeve for a limited time once in each rotation of said spindle; spring acting locating latches associated with said sleeve and with said transparency carrier; an electric motor driven reducing gear arranged for maintaining said spindle in continuous rotation; translucent panels in the sides of the lantern structure, a transparent area in each said panel alignable with the projector beam; a snap switch controlling the circuit of said lamp, and means for opening and closing said switch respectively at each intermittent rotational movement of the sleeve.

6. Intermittent rotation gearing for a display lantern, comprising a vertical post spindle and means for rotating it continuously; a sleeve rotatable on said spindle and carrying the lantern; a fixed horizontal disc with a ramp on the top face of it, two discs fixed in spaced relation on the sleeve above said ramp disc, a spring depressed slide key in the lower one of said discs, and a symmetrical group of slots in the upper one of said discs registering with said key and said ramp.

7. In apparatus according to claim 1, an air propeller on the motor spindle, substantially as described.

8. In apparatus according to claim 1, a spring opened snap-switch in the lamp circuit, controlled by the engagement with a striker on it of tappet pins on a flange fixed to the intermittently rotatable sleeve on the driving spindle, substantially as described.

In testimony whereof I affix my signature.

HENRY PARKS.